United States Patent [19]

Sieczkiewicz

[11] 3,987,541
[45] Oct. 26, 1976

[54] CUTTING GUIDE FOR LAYERED CAKE

[76] Inventor: Robert A. Sieczkiewicz, 3 Laurel St., North Providence, R.I. 02911

[22] Filed: May 15, 1975

[21] Appl. No.: 577,689

[52] U.S. Cl. .................................. 30/114; 30/286; 30/290
[51] Int. Cl.² ......................................... A21C 15/04
[58] Field of Search ............ 30/114, 286, 289, 290, 30/293, 294

[56] References Cited
UNITED STATES PATENTS

| | | | |
|---|---|---|---|
| 1,462,717 | 7/1923 | Maus | 30/114 |
| 3,318,352 | 5/1967 | Seltzer | 30/294 X |
| 3,816,919 | 6/1974 | Portnoy | 30/124 |

*Primary Examiner*—Al Lawrence Smith
*Assistant Examiner*—J. T. Zatarga
*Attorney, Agent, or Firm*—Max Schwartz

[57] ABSTRACT

A guide for cutting a cake into multiple layers. A pair of vertically positioned walls are joined adjacent their rear edges in a generally V-shape. The walls are slanted to taper upwardly from an integral base portion to an integral top and forming an open front. The front edges of the walls are provided with spaced horizontal slots extending inwardly from their front edges. The slots are approximately 0.0625 inch in width, between 1 inch and 1½ inches in length, and approximately ½ inch apart. The slots in each wall are in horizontal alignment with each other whereby a knife blade can be inserted horizontally between pairs of slots to be held in a horizontal position at a predetermined level. A cake can be turned against the knife blade to slice a horizontal layer from the top portion of the cake. The blade can then be successively lowered from slot to slot to cut the cake into a plurality of ½ inch layers. The device may be stamped from metal or molded from a suitable plastic material.

3 Claims, 4 Drawing Figures

CUTTING GUIDE FOR LAYERED CAKE

BACKGROUND OF THE INVENTION

Multilayer cakes are pretty and tasty and usually made professionally. Power driven multiple cutting blades can slice a cake easily and rapidly into a plurality of uniform layers. Icing can then be applied to finish the popular "seven layer cake". Since householders do not own such expensive sophisticated machines, most housewives limit their baking to two or three layer cakes, cutting the layers by eye measurement. Attempts to make five, six or seven layer cakes result in disaster, the layers being broken and irregular in thickness.

SUMMARY OF THE INVENTION

The present invention provides a simple and easily manufactured guide for slicing a cake into a plurality of equal layers. A pair of vertical walls are integrally connected along one edge, the walls extending outwardly in a V-shape. The outer edges are provided with complementary horizontal slots, approximately ½ inch apart. When a long carving knife is positioned across aligned slots, the knife is held in a horizontal position to allow the cake to be turned against the blade to remove a layer of cake. The knife can then be successively lowered from slot to slot, each time cutting another ½ inch layer from the cake. The layers will thus be uniform in size and thickness. For easy manufacture, cleaning and handling, it is preferred to mold the device of plastic material.

DESCRIPTION OF THE INVENTION

The cake cutting guide of the present invention is preferably molded of a plastic material, but can be stamped from metal such as aluminum or stainless steel. Referring more in detail to the drawings, a pair of elongated generally rectangular wall portions 10 and 11 are positioned in angular relation to each other in a general V-shape. At their rear edges, the walls 10 and 11 are integrally joined by an elongated triangular wall member 12 which tapers upwardly to hold the walls 10 and 11 in contiguous position at the top and separated at the bottom, see FIG. 1.

Figure 4:
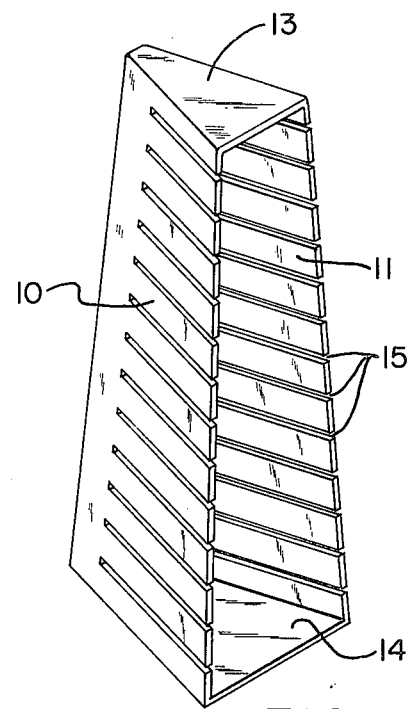
FIG. 4 is a perspective view of the device.

The front is open, FIG. 4, but the walls 10 and 11 are held rigidly in position by integral top wall 13 and integral bottom wall 14. It is preferred that the device be approximately 7 inches in height, and that each wall 10 and 11 be approximately 2 inches wide at the top and 2 and ⅞ inches wide at the bottom.

At ½ inch intervals, each wall 10 and 11 is provided with horizontal slots 15 extending from the free front edges to approximately ½ inch from the rear edge. The slots on the walls are horizontally aligned so that a pair of spaced slots 15 are at each horizontal level.

Figure 1:
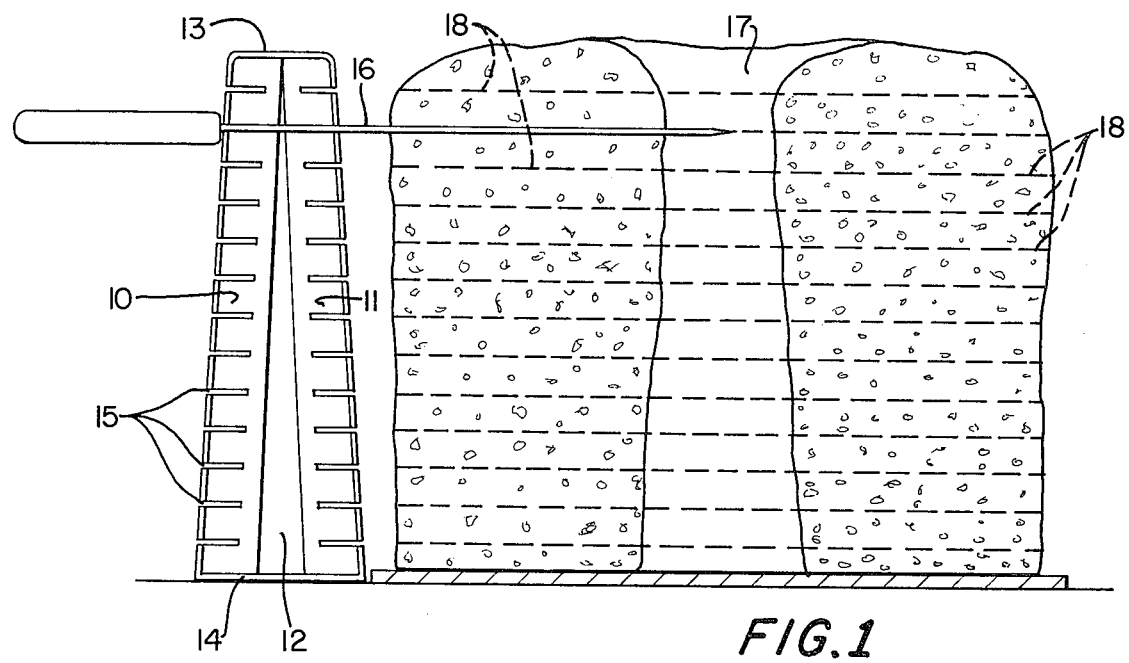
FIG. 1 is a front elevation of the cake cutting guide in use, the cake being shown in section.
Figure 2:
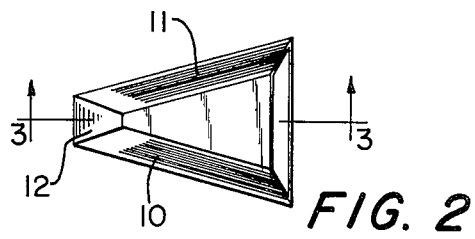
FIG. 2 is a top plan view of the device.
Figure 3:
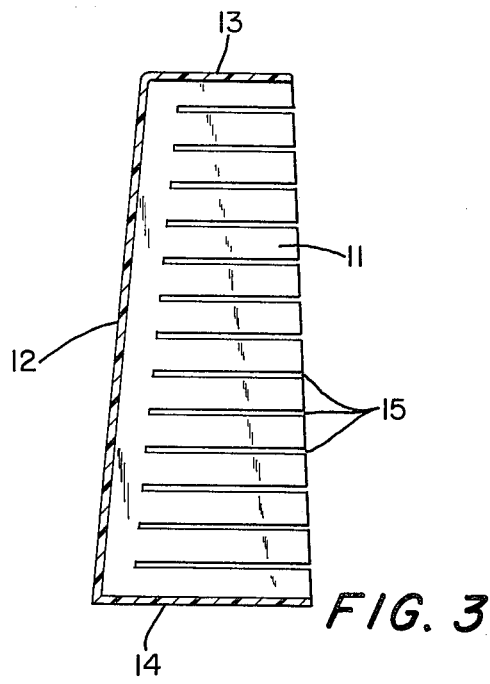
FIG. 3 is a section taken on line 3—3 on FIG. 2.

As shown in FIG. 1, the device is simple to use. A long knife blade 16 is inserted into an upper pair of slots 15 to hold the blade 16 horizontally in position to cut a top layer from the cake 17 as it is being rotated against the blade. After this layer has been removed, the knife is dropped ½ inch to the next lower pair of slots and a second layer is cut off the top. Of course, if thicker layers are desired, the knife can be lowered two or more slots at each cutting. In this manner, the cake can be progressively sliced into a plurality of layers as indicated by the dotted lines 18 in FIG. 1. The layers of cake are of uniform thickness across each layer, and each layer is uniformly comparable to each of the other layers.

I have thus provided a simple device for guiding a knife to cut a cake into a plurality of equal layers. The device is easy and economical to manufacture, it can be readily molded of a plastic material, and requires no assembly operation since it has no moving parts. Other advantages of the present invention will be readily apparent to a person skilled in the art.

I claim:

1. A cake cutting guide comprising a pair of vertically positioned generally rectangular wall portions integrally connected at their rear edges to position said wall portions in a V-shape, and means on said wall portions for retaining a knife blade in horizontal position at a predetermined position on said wall portions, said wall portions being connected at the top and bottom ends by integral horizontal top and bottom walls, said wall portions being integrally connected at their rear edges by an upwardly tapered rear wall to tilt said wall portions inwardly at the top, whereby a cake can be turned against the blade to cut the cake into layers.

2. A cake cutting guide as in claim 1, wherein said knife retaining means comprises spaced horizontal slots at the front edge of each wall portions.

3. A cake cutting guide as in claim 2, wherein said slots are equidistantly spaced from each other and the slots on said wall portions are horizontally aligned with each other.

* * * * *